United States Patent [19]
Katagiri

[11] Patent Number: 5,164,149
[45] Date of Patent: Nov. 17, 1992

[54] NUCLIDE SEPARATION TYPE OF PRECIPITATOR SYSTEM

[75] Inventor: Masaki Katagiri, Tokai, Japan

[73] Assignee: Japan Atomic Energy Research Institute, Tokyo, Japan

[21] Appl. No.: 745,357

[22] Filed: Aug. 15, 1991

[30] Foreign Application Priority Data

Aug. 28, 1990 [JP] Japan .................. 2-224353

[51] Int. Cl.⁵ ............................. G01T 1/00
[52] U.S. Cl. .......................... 376/154; 376/253; 250/328; 250/370.03
[58] Field of Search .......... 376/154, 153, 253; 250/328, 370.03, 380, 432 R, 432 PD

[56] References Cited

U.S. PATENT DOCUMENTS

| | | | |
|---|---|---|---|
| 3,723,736 | 3/1973 | Laney | 250/328 |
| 3,784,823 | 1/1974 | Kostic et al. | 376/253 |
| 4,005,292 | 1/1977 | Oesterlin et al. | 250/328 |
| 4,628,205 | 12/1986 | van Cauter et al. | 250/328 |

*Primary Examiner*—Daniel D. Wasil
*Attorney, Agent, or Firm*—Oblon, Spivak, McClelland, Maier & Neustadt

[57] ABSTRACT

The present invention is directed to a nuclide separation precipitator system in which noble gas nuclear fission products are introduced into a gas reservoir and generate charged daughter nuclides in the gas reservoir. A collector collects three detectable charged daughter nuclides. A detector detects the energy distributions of beta-rays and gamma-rays emitted from the daughter nuclides collected in the collector and outputs signals indicative of the detected beta-rays and gamma-rays. Three pulse height discriminators discriminate the signals output from the detector into three respective energy levels of a low energy range, a middle energy range, and a high energy range. A first order simultaneous equation of three unknowns obtained by utilizing a fact that counting ratios of the three energy ranges vary for each daughter nuclide is then solved.

6 Claims, 7 Drawing Sheets

Fig. 4
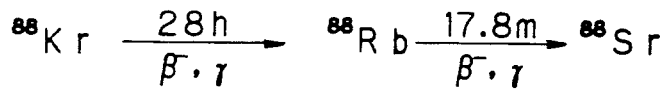
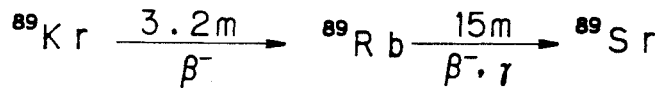
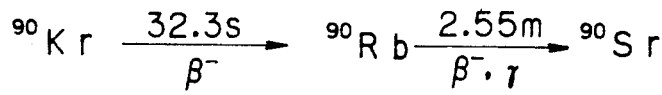
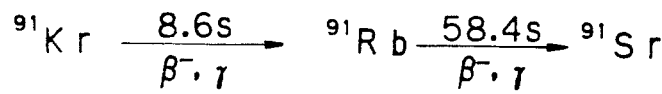
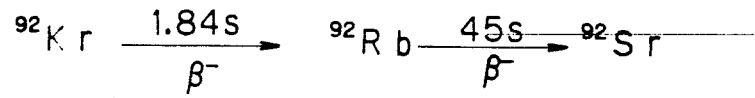
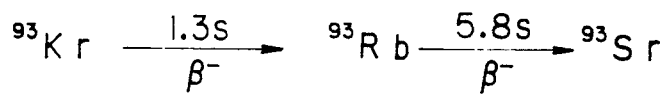
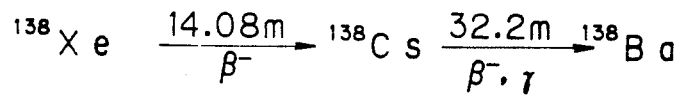
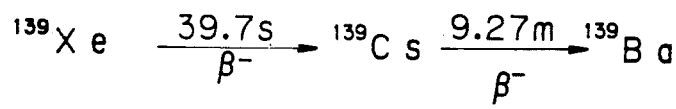
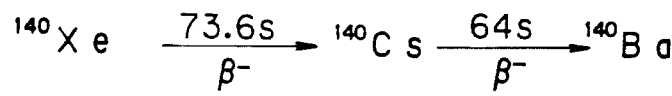
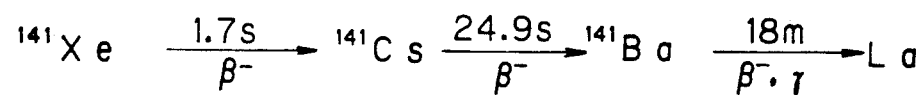
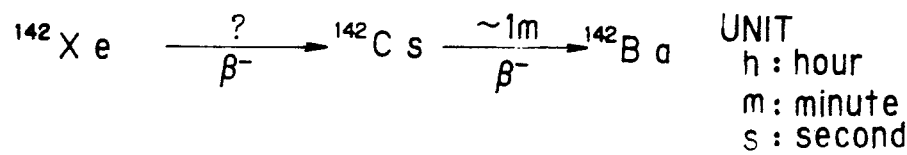
UNIT
h : hour
m : minute
s : second

NUCLIDE SEPARATION TYPE OF PRECIPITATOR SYSTEM

BACKGROUND OF THE INVENTION (a) Field of the Invention

The present invention relates to a nuclide separation type of precipitator system.

More particularly, the present invention relates to an improvement of a wire driving type of precipitator system (hereinafter called a "precipitator" for short) for measuring radioactivities of noble gas nuclear fission products which are produced by a nuclear fission and released into gas.

(b) Description of the Prior Art

A precipitator is an apparatus for measuring radioactivities of a nuclide that is a noble gas nuclear fission product released in case a fuel failure occurs during the operation of a nuclear reactor or when an uranium irradiation test is performed in a nuclear reactor and others, and that its daughter nuclide which is a new nuclide produced by beta-decay of a noble gas nuclear fission product nuclide emits beta-ray in a short time as below a half life of about 30 minutes.

A prior precipitator will now be explained with reference to FIG. 1.

A sample gas 2 containing noble gas nuclear fission products flowing through a sampling pipe 1 introduced into a gas reservoir 3 of the precipitator, in which, when the noble gas nuclear fission product emits a beta-ray, a daughter nuclide newly produced thereby is charged in positive.

Consequently, when applying a negative voltage to a metallic wire 4 placed in the center of the gas reservoir 3 by using a high voltage power supply, the daughter nuclide is attracted to the wire 4 and percipitates thereonto.

After being left as it is in the gas reservoir 3 for a given period of time (Ts) for collecting the daughter nuclides, the wire 4 is moved to the position of scintillation detector 6 by a wire-driving mechanism 5, wherein the beta-ray emitted when the daughter nuclide precipitated decays according to its half-life is detected.

The signals detected are divided into noises and beta-ray signals by using a pulse height discriminator 7 and the discriminated signal is input to a counting circuit 8 and is counted.

Generally, the precipitator is used for such a purpose that, when all detectable nuclides are measured as in the fuel failure detection of a light-water type power reactor and it is over a preset value, a fuel failure is regarded as occurring.

In contrast, for the fuel failure detection of gas-cooled type reactor and others in which the difference in the half-life of noble gas nuclear fission products influences the sensitivity of failure detection greatly, or for the precise measurement of noble gas releasing behavior in the fuel irradiation test, such detecting characteristics as being highly sensitive, fast in responding time and capable of measuring radioactivity for every nuclides are required.

From a viewpoint of separation-measurement of noble gas nuclear fission product nuclides, as shown in FIG. 2, such a method as flowing a gas containing noble gas nuclear fission product through the gas reservoir 1, detecting gamma-ray emission by means of a Ge detector 2 and measuring and analysing it by means of a multichannel pulse height analyzer system 3 to measure radioactivity for all nuclides separately has been generally known.

However, this method has a disadvantage of being so low in detection sensitivity that it is necessary to measure for a long time for obtaining sufficient counts for measuring radioactivity for all nuclides.

And, as a prior art for separation-measurement of noble gas nuclear fission product nuclides by the precipitator, as shown in FIG. 3, a method of utilizing three kinds of delay pipe, and separating the nuclides using only a difference of decrement of noble gas nuclear fission products due to the half-life has been well known.

However, this method also has such a disadvantage that, in order to measure radioactivity of three nuclides separately, three precipitators with uniform characteristics are required, and, for improving the separation-characteristics, it is necessary to take a large delay time so that the difference of decrement of noble gas nuclear fission products due to half-life becomes large, and, since the same time as the delay time is required for obtaining the results, it takes a long time for detection.

SUMMARY OF THE INVENTION

An object of the present invention is to provide a nuclide separation type of precipitator in which the above described problems have been solved.

As the result of applying himself to research for attaining this object, the present inventor has come to invent the present nuclide separation type of precipitator which is characterized by being capable of separately measuring radioactivity of noble gas nuclear fission product nuclides released from a nuclear fuel with each nuclide at high sensitivity and for a short time.

BRIEF EXPLANATION OF DRAWING

FIG. 4 shows nuclides which can be detected by a precipitator, among noble gas nuclear fission product nuclides released from nuclear reactor.

Figure 6:
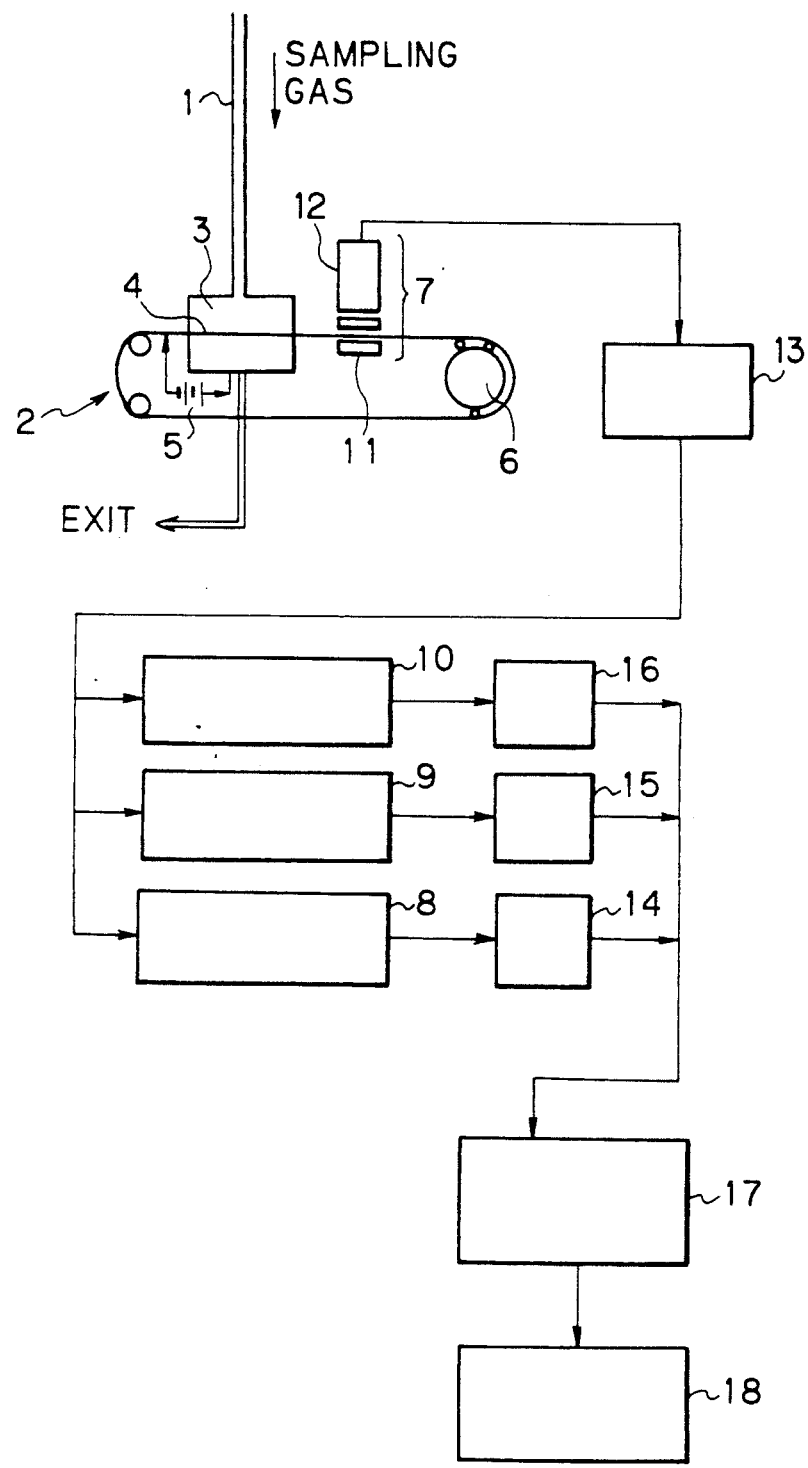

In the figure:
1: precipitator;
2: gas reservoir of precipitator;
3: metallic wire;
4: high-voltage power supply;
5: wire driving mechanism;
6: scintillation detector;
7: scintillator;
8: pulse height discriminator for low energy range;
9: pulse height discriminator for middle energy range;
10: pulse height discriminator for high energy range;
11: counting circuit for low energy range;
12: counting circuit for middle energy range; and
13: counting circuit for high energy range;

FIG. 6 is a diagram of an embodiment of the present precipitator system.

In the figure:
1: sampling pipe;
2: precipitator;
3: gas reservoir of precipitator;
4: metallic wire;
5: high-voltage power supply;
6: wire driving mechanism;
7: scintillation detector;
8: pulse height discriminator for low energy range;
9: pulse height discriminator for middle energy range;
10: pulse height discriminator for high energy range;
11: scintillator;
12: photomultiplier;
13: amplifier;
14: counting circuit for low energy range;
15: counting circuit for middle energy range;
16: counting circuit for high energy range;
17: small size computer; and
18: indicating device.

Figure 7:
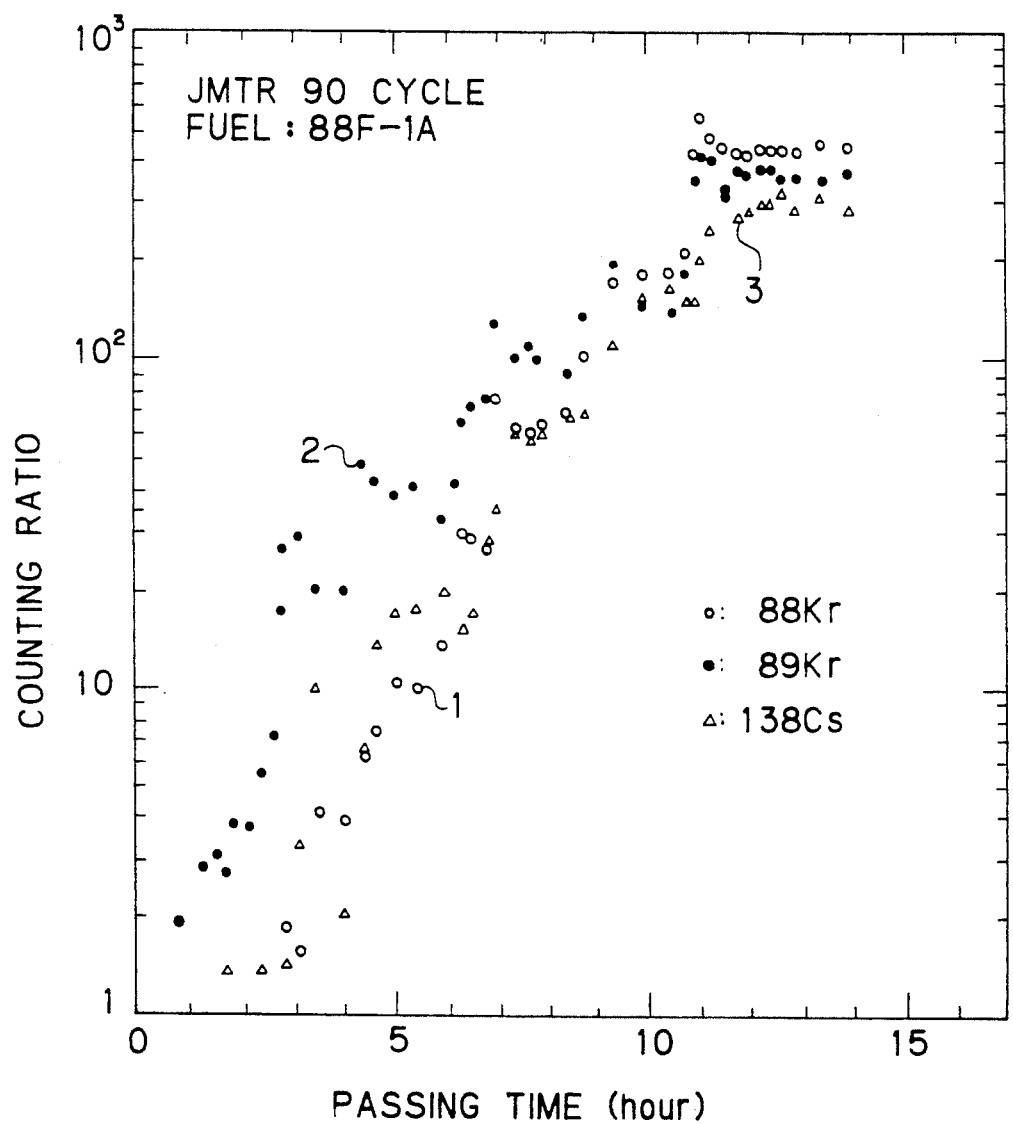

FIG. 7 shows a result of separation-measurement of $^{88}$Kr, $^{89}$Kr and $^{138}$Xe in the irradiation test of coatedparticle fuel using the present precipitator system.

In the figure:
1: counting distribution of $^{88}$Kr;
2: counting distribution of $^{89}$Kr; and
3: counting distribution of $^{138}$Xe.

DESCRIPTION OF THE PREFERRED EMBODIMENT

What is recognized as a precipitator detectable nuclide among noble gas nuclear fission product nuclides released from a nuclear fuel (uranium, plutonium amd others) is eleven nuclides as shown in FIG. 4.

Among these eight nuclides are so short in half-life that, in case a precipitator is provided in such a manner that is takes over 5 minutes to flow from a place of production to the precipitator by means of a delay-pipe or a long pipe, they decay before they reach there.

Therefore, in this case the following three nuclides are an object of measurement:

$^{88}$Kr (half-life: 2.8 hours),
$^{89}$Kr (half-life: 3.2 minutes), and
$^{138}$Xe (half-life: 14.1 minutes).

The nuclide separation type of precipitator system of the present invention will be explained with reference to FIG. 5.

Figure 1:
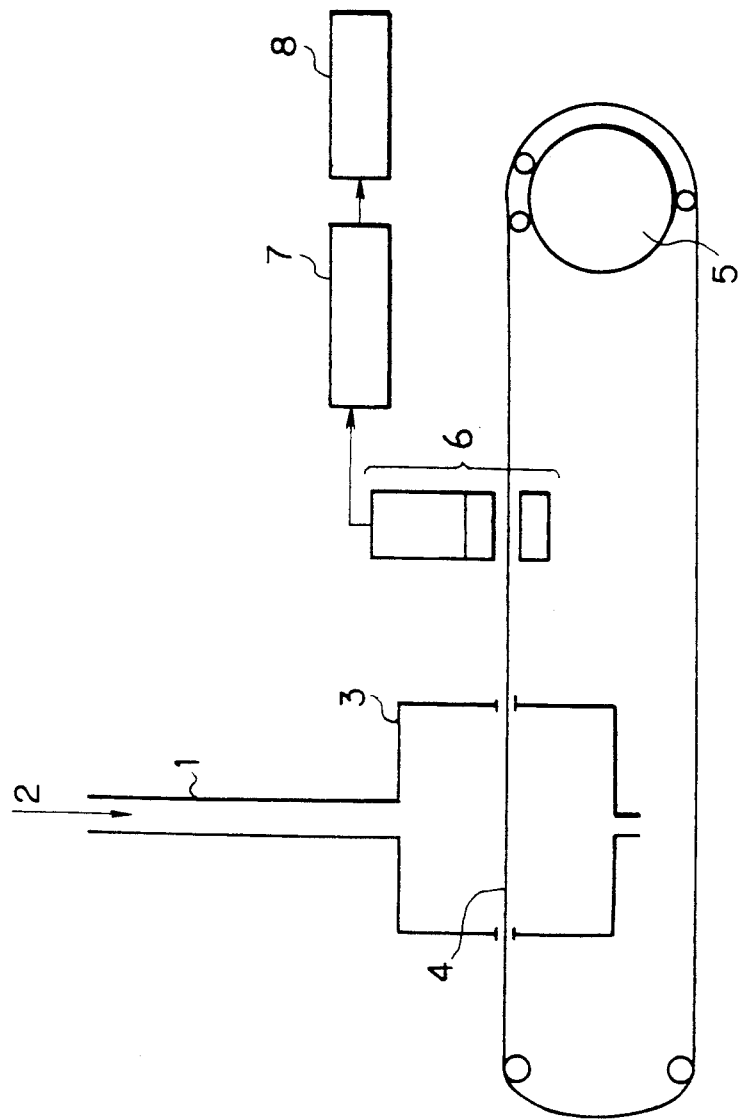
FIG. 1 is a diagram of the prior precipitator.
In the figure:
1: sampling pipe;
2: sampling gas;
3: gas reservoir of precipitator;
4: metallic wire;
5: wire driving mechanism;
6: scintillation detector;
7: pulse height discriminator; and
8: counting circuit.
Figure 2:
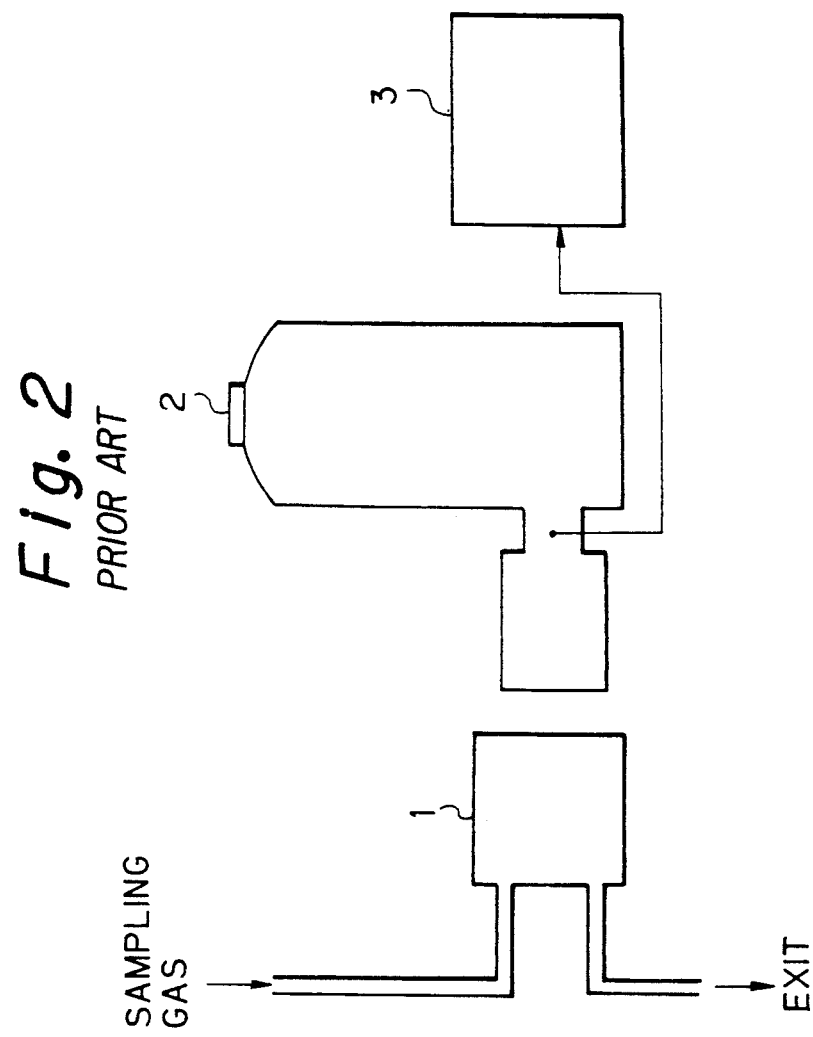
FIG. 2 is a diagram of a nuclide separation type of measurement system using a Ge detector.
In the figure:
1: sampling gas reservoir;
2: Ge gamma-ray detector; and
3: multichannel pulse height analyzer system.
Figure 3:
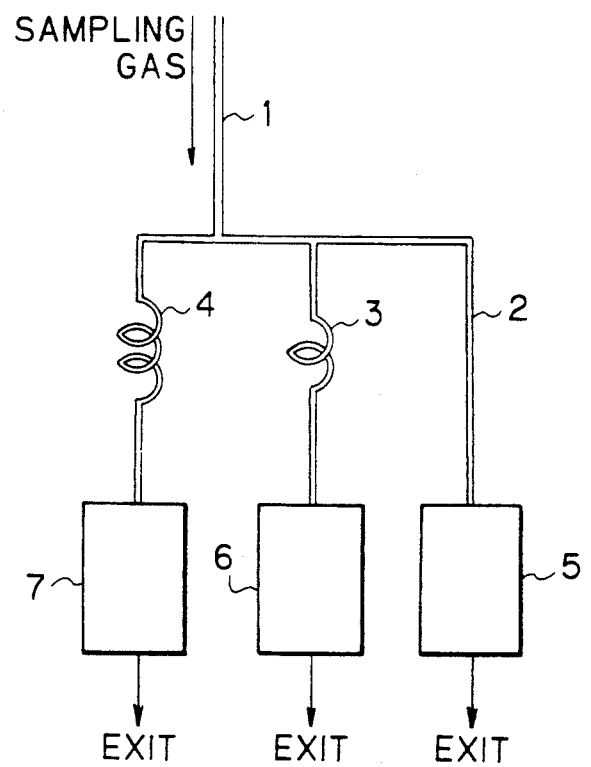
FIG. 3 is a diagram of the prior precipitator system utilizing three kinds of delay pipe.
In the figure:
1: sampling pipe;
2: delay pipe I;
3: delay pipe II;
4: delay pipe III;
5: precipitator I;
6: precipitator II; and
7: precipitator III.
Figure 5:
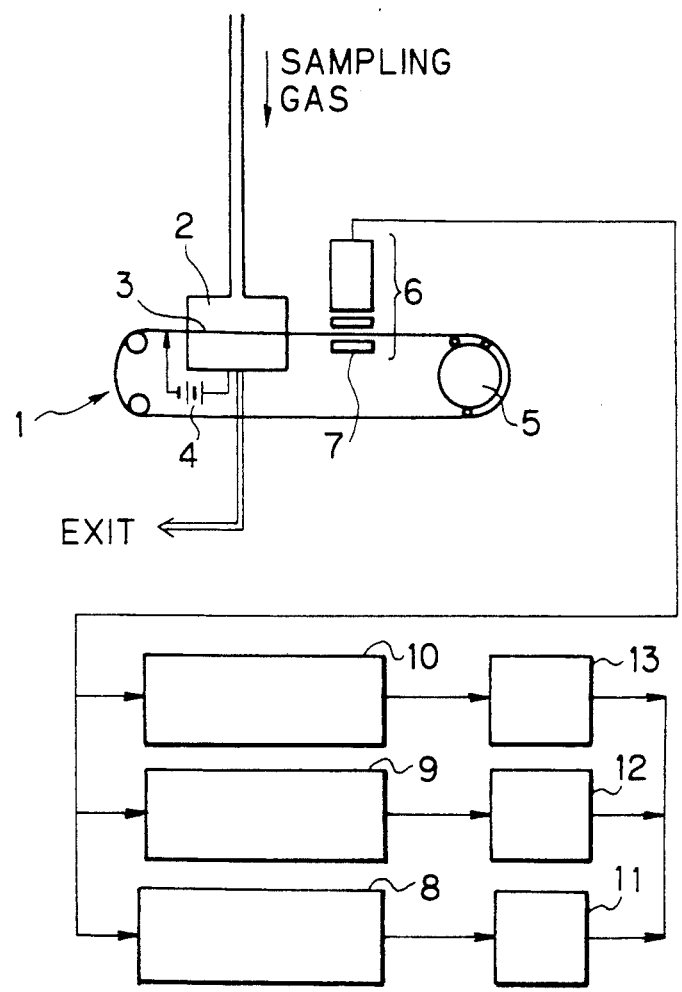
FIG. 5 is a diagram of the precipitator system of the present invention.

In FIG. 5, the noble gas nuclear fission product is introduced into the gas reservoir 2 of precipitator 1, wherein it emits a beta-decay, and a daughter nuclide produced by the decay is charged in positive, and, therefore when applying a negative voltage to a metallic wire 3 placed in the center of the gas reservoir 2 by using a high voltage power supply, the daughter nuclide is attracted to the wire 3 to precipitate thereonto.

After being left as it is in the gas reservoir 2 for a given period of time (Ts), the wire 3 is moved to the position of scintillation detector 6 by a wire driving mechanism 5, wherein the beta-ray emitted when the daughter nuclide precipitated decays is detected.

The above is the prior art.

The main point of the nuclide separation type of precipitator system of the present invention consists in separating nuclide on the basis of a knowledge that energy distributions of beta-rays and gamma-rays emitted from daughter nuclide varies with each nuclides.

Therefore, when detecting beta-rays and gamma-rays emitted from daughter nuclides precipitated on the wire 3, a scintillator 7 having such a performance as capable of discriminating the pulse height distribution of beta-ray energy to 5 MeV is used, and the pulse height distribution of beta-rays detected is divided into three ranges of a low energy range, a middle energy range and a high energy range using three pulse height discriminators 8, 9 and 10 and counted by counting circuits 11, 12 and 13 to obtain counting values $S_L$, $S_m$ amd $S_h$.

In the prior precipitators an organic scintillator of about 1 mm in thickness has been used for lowering the background, but it is impossible for discrimination of pulse height.

So, the scintillator 7 used in the present precipitator is of a large stopping power to beta-rays and large in thickness in material.

Moreover, since partial gamma-rays emitted from the daughter nuclides at the same time are detected because the stopping power to gamma-rays of this scintillator becomes large also, the pulse height distribution depends on the energy of beta-rays and the energy of gamma-rays emitted from the daughter nuclides.

Hereupon, numbers of beta-rays emitted from daughter nuclides $^{88}$Rb, $^{89}$Rb and $^{138}$Cs are denoted as $N_1$, $N_2$ and $N_3$.

And, the counting ratios of three nuclides distributed into low energy range, middle energy range and high energy range, which are discriminated by the pulse height by the above mentioned three pulse height discriminators, are denoted as $E_{L1}$, $E_{m1}$, $E_{h1}$, $E_{l2}$, $E_{m2}$, $E_{h2}$, $E_{L3}$, $E_{m3}$ and $E_{h3}$.

In this time, since the three nuclides differ in pulse height distribution because of a different distribution of their beta-ray energy and gamma-ray energy, $E_{L1}$, $E_{m1}$, $E_{h1}$, $E_{L2}$, $E_{m2}$, $E_{h2}$, $E_{L3}$, $E_{m3}$ and $E_{h3}$ are independent mutually.

Therefore, the following first order simultaneous equations of three unknowns are obtained:

$$E_{l1} \cdot N_1 + E_{l2} \cdot N_2 + E_{l3} \cdot N_3 = S_l$$
$$E_{m1} \cdot N_1 + E_{m2} \cdot N_2 + E_{m3} \cdot N_3 = S_m$$
$$E_{h1} \cdot N_1 + E_{h2} \cdot N_2 + E_{h3} \cdot N_3 = S_h$$

These equations can be mathematically strictly solved because of being independent mutually, so the numbers $N_1$, $N_2$ and $N_3$ in proportion to daughter nuclides $^{88}$Rb, $^{89}$Rb and $^{138}$Cs of three nuclides $^{88}$Kr, $^{89}$Kr and $^{138}$Xe, which beta-decayed in the interior of scintilator, can be obtained separately.

Moreover, radioactivities of noble gas nuclear fission products, $^{88}$Kr, $^{89}$Kr and $^{138}$Xe, are obtained by correcting $N_1$, $N_2$ and $N_3$ with calibration constants measured by using gas of known concentration of radioactivities of $^{88}$Kr, $^{89}$Kr and $^{138}$Xe.

EXAMPLE

The precipitator system of the present invention will be explained in detail with reference to FIG. 6.

A gas flowing through a sampling pipe 1 is introduced into a precipitator 2.

The noble gas nuclear fission product introduced into the gas reservoir 3 emits a beta-ray herein, and daughter nuclides produced thereby are charged in positive and then, when applying a negative voltage to a metallic wire 4 placed in the center of the gas reservoir 3, the daughter nuclides are attracted to the wire 4 and precipitate thereonto.

After being left as it is in the gas reservoir 3 for a given period of time (Ts), the wire 4 is moved to the position of scintillation detector 7 by a wire driving mechanism 6, wherein the beta-rays emitted when the daughter nuclides precipitated decays according to their half-life is detected.

The process as far as here is utilized in the prior art as it is.

The main point of the nuclide separation type of precipitator system of the present invention in operation consists in counting the pulse height distribution of beta-rays and partial gamma-rays detected by a scintillation detector 7 when the daughter nuclides precipitated on the wire 4 emit beta-rays, dividing three ranges of a low energy range, a middle energy range and a high energy range by using three pulse height discriminators 8, 9 and 10.

In this time, a lower discrimination level of the discriminator for the low energy range is set on a value equivalent to beta-ray energy of 300 KeV or more because the influence of gamma-rays emitted due to beta-decay of the daughter nuclide is as few as possible.

Another main point of the present invention is to use CaF (Eu) of 6 mm in thickness for a material of the scintillator so that the pulse height distribution having the maximum energy (5 MeV) of beta-rays can be measured, in contrast to the prior scintillator 11 which is an organic scintillator and is very thin as about 1 mm in thickness for making the background low.

The signal converted to an electric signal by the photomultiplier 12 is input to the above three pulse height discriminators after being amplified by means of the amplifier 13.

The output signals from the three pulse height discriminators are being input to the computer 17 after input to the counting circuits 14, 15 and 16 to be counted.

In this computer 17 the above mentioned first order simultaneous equations of the three unknowns are solved and the counting number of each nuclide is indicated on the indicating device 18.

The counting ratios $E_{l1}$, $E_{m1}$, $E_{h1}$, $E_{l2}$, $E_{m2}$, $E_{h2}$ $E_{l3}$, $E_{m3}$ and $E_{h3}$ for the low energy range, middle energy range and high energy range of $^{88}$Kr, $^{89}$Kr and $^{138}$Xe to be given to the above mentioned first order simultaneous equations of three unknowns are given as follows:

About $E_{l1}$, $E_{m1}$ and $E_{h1}$, since the half-life of mother nuclide $^{88}$Kr is long, about 2.8 hours) in comparison with those of $^{89}$Kr (3.2 minutes) and $^{138}$Xe (14.1 minutes), when sealing a sampling gas of these three nuclides mixed in the gas reservoir 3 of precipitator and, after leaving it as it is for 3 hours, moving the wire 4 and measuring, the pulse height distribution of only $^{88}$Rb can be obtained.

$E_{l1}$, $E_{m1}$ and $E_{h1}$ can be determined by using this pulse height distribution.

About $E_{l2}$, $E_{m2}$ and $E_{h2}$, since the half-life of mother nuclide $^{89}$Kr is short, about 3.2 minutes, in comparison with those of $^{88}$Kr (2.8 hours) and $^{138}$Xe (14.1 minutes), when sealing a sampling gas of these three nuclides mixed in the gas reservoir 3 of precipitator and deducting the resulting data of determining after 3 minutes from that of determining immediately after sealing, the pulse height distribution of almost only $^{89}$Rb can be obtained.

The pulse height distribution of only $^{89}$Rb can be obtained by removing the influence of $^{88}$Rb and $^{138}$Cs on the basis of the obtained pulse height distribution of only $^{88}$Rb and $^{138}$Cs.

$E_{l2}$, $E_{m2}$ and $E_{h2}$ can be determined by using this pulse height distribution.

About $E_{l3}$, $E_{m3}$ and $E_{h3}$, since the half-life of $^{138}$Cs (32.2 minutes) which is a daughter nuclide of $^{138}$Xe is longer in comparison with those of $^{88}$Rb (17.8 minutes) and $^{89}$Rb (15.2 minutes) which are daughter nuclides of $^{88}$Kr and $^{89}$Kr, respectively, when introducing a sampling gas of three nuclides mixed into the gas reservoir 3 of the precipitator and moving the wire 4 to the precipitator and then, after leaving it as it is for 3 hours and more, measuring beta-rays, the pulse height distribution of only $^{138}$Cs can be obtained.

$E_{l3}$, $E_{m3}$ and $E_{h3}$ can be determined by using this pulse height distribution.

In an irradiation test of coated particle fuel using the present precipitator system, the result of separation-measurement of $^{88}$Kr, $^{88}$Kr and $^{138}$Xe is shown in FIG. 7.

This is a data measured at the time of the starting-up of nuclear reactor.

Consequently it has become clear that the counting distributions measured at the starting-up are different due to the nuclides and it has been confirmed that the present system is effective as a nuclide separation type of precipitator system.

What is claimed is:

1. A nuclide separation precipitator system in which noble gas nuclear fission products are introduced into a gas reservoir and generate charged daughter nuclides in the gas reservoir, comprising:

collecting means for collecting three detectable charged daughter nuclides;

detecting means for detecting energy distributions of beta-rays and gamma-rays emitted from the three detectable daughter nuclides collected in the collection means, and outputting signals indicative of the detected beta-rays and gamma-rays;

three pulse height discriminators for discriminating the signals output from the detecting means into three respective energy ranges of a low energy range, a middle energy range and a high energy range; and means for solving a first order simultaneous equation of three unknowns obtained by utilizing a fact that counting ratios of the three energy ranges vary for each collected daughter nuclide.

2. The nuclide separation precipitator system according to claim 1, wherein the collecting means comprises a wire having an opposite charge as the generated daughter nuclides.

3. The nuclide separation precipitator system according to claim 1, wherein the detecting means comprises a scintillation detector.

4. The nuclide separation precipitator system according to claim 3, wherein the scintillation detector has a thickness greater than 6 mm.

5. The nuclide separation precipitator system according to claim 2, wherein the detecting means comprises a scintillation detector.

6. The nuclide separation precipitator system according to claim 5, wherein the scintillation detector has a thickness greater than 6 mm.

* * * * *